(12) United States Patent
Li et al.

(10) Patent No.: US 12,317,141 B2
(45) Date of Patent: *May 27, 2025

(54) COMMUNICATION METHOD, APPARATUS, AND SYSTEM

(71) Applicant: Huawei Technologies Co., Ltd., Shenzhen (CN)

(72) Inventors: Bingzhao Li, Beijing (CN); Yan Wang, Beijing (CN); Wei Quan, Beijing (CN); Jian Zhang, Shenzhen (CN); Xiaodong Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,535

(22) Filed: Jul. 19, 2022

(65) Prior Publication Data

US 2022/0353756 A1 Nov. 3, 2022

Related U.S. Application Data

(63) Continuation of application No. 16/271,457, filed on Feb. 8, 2019, now Pat. No. 11,457,385, which is a
(Continued)

(51) Int. Cl.
*H04W 36/00* (2009.01)
*H04W 36/12* (2009.01)
(Continued)

(52) U.S. Cl.
CPC ....... *H04W 36/0033* (2013.01); *H04W 36/12* (2013.01); *H04W 76/20* (2018.02)

(58) Field of Classification Search
CPC . H04W 36/0033; H04W 36/12; H04W 36/24; H04W 76/20; H04W 24/10;
(Continued)

(56) References Cited

U.S. PATENT DOCUMENTS

| 6,122,372 | A | 9/2000 | Hughes |
| 2011/0149848 | A1 | 6/2011 | Ho et al. |

(Continued)

FOREIGN PATENT DOCUMENTS

| CN | 101820652 A | 9/2010 |
| CN | 101848536 A | 9/2010 |

(Continued)

OTHER PUBLICATIONS

"Resume ID for non-NB-IoT UEs," 3GPP TSG-RAN WG2 Meeting #93bis, Dubrovnik, Croatia, R2-162269, Total 3 pages, 3rd Generation Partnership Project, Valbonne, France (Apr. 11-15, 2016).

(Continued)

*Primary Examiner* — Liton Miah
(74) *Attorney, Agent, or Firm* — Leydig, Voit & Mayer, Ltd.

(57) ABSTRACT

Embodiments of the present disclosure disclose a communication method, an apparatus, and a system. The communication method includes: receiving, by a terminal device, a context identifier sent by a second radio access network device, and sending, to a first radio access network device, a first message that includes the context identifier; receiving, by a core network device, a second message sent by the first radio access network device, and sending, to the second radio access network device, a message that includes the context identifier; and receiving, by the core network device, context information of the terminal device that is sent by the second radio access network device, and sending the context information to the first radio access network device. Therefore, communication between the first radio access network device and the second radio access network device is ensured, and working efficiency is improved.

18 Claims, 9 Drawing Sheets

Related U.S. Application Data continuation of application No. PCT/CN2016/095030, filed on Aug. 12, 2016.

(51) Int. Cl.
*H04W 36/24* (2009.01)
*H04W 76/20* (2018.01)

(58) Field of Classification Search
CPC ............... H04W 76/10; H04W 36/005; H04W 36/0055; H04W 48/18; H04W 72/04; H04W 76/25
See application file for complete search history.

(56) References Cited

U.S. PATENT DOCUMENTS

| | | | |
|---|---|---|---|
| 2013/0090087 A1 | 4/2013 | Kroeselberg | |
| 2013/0136025 A1 | 5/2013 | Li et al. | |
| 2013/0260810 A1 | 10/2013 | Rayavarapu | |
| 2014/0079038 A1* | 3/2014 | Maeda | H04W 48/02 |
| | | | 370/336 |
| 2014/0179325 A1 | 6/2014 | Xu et al. | |
| 2014/0241227 A1 | 8/2014 | Wu et al. | |
| 2014/0315537 A1 | 10/2014 | Van Lieshout et al. | |
| 2015/0282048 A1 | 10/2015 | Zhang et al. | |
| 2017/0332257 A1* | 11/2017 | Fan | H04W 8/30 |
| 2017/0347296 A1 | 11/2017 | Wu | |
| 2019/0150218 A1 | 5/2019 | Futaki | |
| 2019/0159079 A1* | 5/2019 | Xu | H04W 36/08 |
| 2019/0166559 A1 | 5/2019 | Chen et al. | |
| 2020/0322787 A1* | 10/2020 | Sivakeesar | H04W 24/02 |
| 2021/0185759 A1* | 6/2021 | Ohlsson | H04W 76/11 |
| 2021/0337434 A1 | 10/2021 | Yu et al. | |

FOREIGN PATENT DOCUMENTS

| | | |
|---|---|---|
| CN | 102118808 A | 7/2011 |
| CN | 102348256 A | 2/2012 |
| CN | 102474753 A | 5/2012 |
| CN | 102625470 A | 8/2012 |
| CN | 103079243 A | 5/2013 |
| CN | 103108351 A | 5/2013 |
| CN | 103782628 A | 5/2014 |
| CN | 103945537 A | 7/2014 |
| EP | 3373692 A1 | 9/2018 |
| EP | 3389315 A1 | 10/2018 |
| EP | 3389331 A1 | 10/2018 |
| WO | 2011150774 A1 | 12/2011 |
| WO | 2012131568 A2 | 10/2012 |

OTHER PUBLICATIONS

"Discussion on truncated Resume ID," 3GPP TSG-RAN WG3 Meeting #92, Nanjing, P.R. China, R3-161252, Total 4 pages, 3rd Generation Partnership Project, Valbonne, France (May 23-27, 2016).

"3rd Generation Partnership Project; Technical Specification Group Radio Access Network; Evolved Universal Terrestrial Radio Access (E-UTRA); Medium Access Control (MAC) protocol specification (Release 13)," pp. 1-91, 3GPP TS 36.321 V13.2.0, 3rd Generation Partnership Project—Valbonne, France (Jun. 2016).

"3rd Generation Partnership Project; Technical Specification Group Radio Access Network; Evolved Universal Terrestrial Radio Access (E-UTRA); Radio Resource Control (RRC); Protocol specification (Release 13)," pp. 1-623, 3GPP TS 36.331 V13.2.0, 3rd Generation Partnership Project—Valbonne, France (Jun. 2016).

"RAN initiated Paging Solution," 3GPP TSG-RAN3 Meeting #92, Nanjing, China, R3-161167, pp. 1-5, 3rd Generation Partnership Project, Valbonne, France (May 23-27, 2016).

"Open issues for cIoT optimization",3GPP TSG-RAN WG2 Meeting#94, Nanjing, China, R2-164320, pp. 1-5, 3rd Generation Partnership Project, Valbonne, France (May 23-27, 2016).

* cited by examiner

COMMUNICATION METHOD, APPARATUS, AND SYSTEM

CROSS-REFERENCE TO RELATED APPLICATIONS

This application is a continuation of U.S. patent application Ser. No. 16/271,457, filed on Feb. 8, 2019, which is a continuation of International Application No. PCT/CN2016/095030, filed on Aug. 12, 2016. All of the afore-mentioned patent applications are hereby incorporated by reference in their entireties.

TECHNICAL FIELD

The present disclosure relates to wireless communications technologies, and in particular, to a communication method in a wireless network, an apparatus, and a system.

BACKGROUND

A light connection technology is being discussed in the 3rd Generation Partnership Project (3GPP) specifications. A terminal device may enter a light connection mode under an instruction of a radio access network (RAN) device. The radio access network device is referred to as an anchor radio access network device. The light connection mode is a state between a radio resource control (RRC) connected mode and an RRC idle mode.

The terminal device that enters a light connection mode from an RRC connected mode obtains a context identifier allocated by the anchor radio access network device. The terminal device and the anchor radio access network device each store connection-related context information. In addition, the terminal device may select, based on cell reselection mobility, a cell to be camped on. The terminal device sends the context identifier to a serving radio access network device of the cell when there is a data transmission requirement. The serving radio access network device sends the context identifier to the anchor radio access network device, to obtain the context information of the terminal device from the anchor radio access network device.

Generally, the foregoing communication process is implemented between the anchor radio access network device and the serving radio access network device by using a configured interface (for example, an X2 interface). However, there may be no available interface between the anchor radio access network device and the serving radio access network device. In this case, communication between the anchor radio access network device and the serving radio access network device cannot be implemented.

SUMMARY

Embodiments of the present disclosure provide a communication method in a wireless network, an apparatus, and a system, to ensure effective communication between an anchor radio access network device and a serving radio access network device, especially when there is no available interface between the anchor radio access network device and the serving radio access network device, thereby improving working efficiency of a system.

In the embodiments of the present disclosure, the serving radio access network device is a first radio access network device, and the anchor radio access network device is a second radio access network device.

According to an aspect, an embodiment of the present disclosure provides a communication method in a wireless network. The method includes: receiving, by a first radio access network device from a terminal device, a first message that includes a context identifier, where the context identifier includes an identifier of a second radio access network device and an identifier of the terminal device that is allocated by the second radio access network device; sending, by the first radio access network device, a second message to a core network device, where the second message includes the context identifier; and receiving, by the first radio access network device, context information of the terminal device from the core network device, where the context information of the terminal device is associated with the identifier of the terminal device. According to the communication method provided in this embodiment, timely and effective communication can be ensured when no available interface exists between the first radio access network device and the second radio access network device, thereby improving working efficiency of a system.

In an embodiment, the context identifier further includes public land mobile network (PLMN) information corresponding to the second radio access network device and/or an area identifier corresponding to the second radio access network device.

In an embodiment, the first message and the second message further include the PLMN information corresponding to the second radio access network device and/or the area identifier corresponding to the second radio access network device.

According to the foregoing embodiment, the core network device can accurately determine the second radio access network device and send a message, so that reliability of communication between the first radio access network device and the second radio access network device is improved.

In an embodiment, the first message further includes indication information, and the indication information indicates that an area identifier corresponding to the first radio access network device is different from the area identifier corresponding to the second radio access network device. The method further includes: sending, by the first radio access network device, an area identifier request message to the terminal device; and receiving, by the first radio access network device from the terminal device, the area identifier corresponding to the second radio access network device. The second message further includes the area identifier corresponding to the second radio access network device.

In an embodiment, the method further includes: determining, by the first radio access network device based on the context identifier, whether additional information needs to be obtained, where the additional information includes the PLMN information corresponding to the second radio access network device and/or the area identifier corresponding to the second radio access network device; if the first radio access network device determines that the additional information needs to be obtained, sending, by the first radio access network device, an additional-information request message to the terminal device; and receiving, by the first radio access network device, the additional information from the terminal device. The second message further includes the additional information.

According to the foregoing embodiment, information carried in the first message can be simplified, a transmission resource occupied by the first message can be reduced, and transmission efficiency can be improved.

In an embodiment, the additional-information request message further includes preamble allocation information, where the preamble allocation information is used to indicate a preamble allocated to the terminal device. The method further includes: receiving, by the first radio access network device, the preamble from the terminal device; sending, by the first radio access network device, an allocated transmission resource to the terminal device; and receiving, by the first radio access network device from the terminal device, the additional information sent by using the transmission resource.

In an embodiment, the second message further includes an identifier of the first radio access network device.

In an embodiment, the method further includes: receiving, by the first radio access network device, verification information from the terminal device. The second message further includes the verification information and information about a serving cell in which the first radio access network device serves the terminal device.

In an embodiment, the sending, by the first radio access network device, a second message to a core network device includes: determining, by the first radio access network device based on the identifier of the second radio access network device, whether an interface exists between the first radio access network device and the second radio access network device; and if the interface does not exist, sending, by the first radio access network device, the second message to the core network device.

According to another aspect, an embodiment of the present disclosure provides a communication method in a wireless network. The method includes: sending, by a second radio access network device, a context identifier to a terminal device, where the context identifier includes an identifier of the second radio access network device and an identifier of the terminal device that is allocated by the second radio access network device; receiving, by the second radio access network device from a core network device, a message that includes the context identifier; and sending, by the second radio access network device, context information of the terminal device to the core network device based on the message that includes the context identifier, where the context information of the terminal device is associated with the identifier of the terminal device. According to the communication method provided in this embodiment, timely and effective communication between a first radio access network device and the second radio access network device can be ensured, thereby improving working efficiency of a system.

In an embodiment, the context identifier further includes PLMN information corresponding to the second radio access network device and/or an area identifier corresponding to the second radio access network device.

In an embodiment, the message that is received by the second radio access network device from the core network device and that includes the context identifier further includes the PLMN information corresponding to the second radio access network device and/or the area identifier corresponding to the second radio access network device.

In an embodiment, the message that is received by the second radio access network device from the core network device and that includes the context identifier further includes at least one of an identifier of a first radio access network device, PLMN information corresponding to the first radio access network device, and an area identifier corresponding to the first radio access network device. The first radio access network device is a radio access network device that serves the terminal device.

In an embodiment, the method further includes: receiving, by the second radio access network device from the core network device, verification information of the terminal device and information about a serving cell in which the first radio access network device serves the terminal device; and verifying, by the second radio access network device, the terminal device based on the verification information and the information about the serving cell.

In an embodiment, before the receiving, by the second radio access network device from a core network device, a message that includes the context identifier, the method further includes: sending, by the second radio access network device, control information to the terminal device, where the control information is used to instruct the terminal device to enter a light connection mode.

According to still another aspect, an embodiment of the present disclosure provides a communication method in a wireless network. The method includes: receiving, by a terminal device, a context identifier from a second radio access network device, where the context identifier includes an identifier of the second radio access network device and an identifier of the terminal device that is allocated by the second radio access network device; and sending, by the terminal device, a first message to a first radio access network device, where the first message includes the context identifier.

In an embodiment, the context identifier further includes PLMN information corresponding to the second radio access network device and/or an area identifier corresponding to the second radio access network device.

In an embodiment, the first message further includes the PLMN information of the second radio access network device and/or the area identifier corresponding to the second radio access network device.

In an embodiment, before the sending, by the terminal device, a first message to a first radio access network device, the method further includes: receiving, by the terminal device, the second area identifier of the second radio access network device; receiving, by the terminal device, a first area identifier of the first radio access network device; and determining, by the terminal device, whether the second area identifier is the same as the first area identifier.

In an embodiment, the first message further includes indication information, where the indication information indicates that the first area identifier is different from the second area identifier.

In an embodiment, the method further includes: receiving, by the terminal device, an area identifier request message sent by the first radio access network device; and sending, by the terminal device, the second area identifier to the first radio access network device in response to the area identifier request message.

In an embodiment, before the sending, by the terminal device, a first message to a first radio access network device, the method further includes: truncating, by the terminal device, the context identifier according to an instruction of the first radio access network device, where the first message includes a part of the context identifier obtained after the truncation.

In an embodiment, after the sending, by the terminal device, a first message to a first radio access network device, the method further includes: receiving, by the terminal device, an additional-information request message from the first radio access network device, where additional information includes at least one of the area identifier corresponding to the second radio access network device, the PLMN information corresponding to the second radio access network device, and another remaining part of the context identifier obtained after the truncation; and sending, by the terminal device, the additional information to the first radio access network device in response to the additional-information request message.

In an embodiment, the additional-information request message further includes preamble allocation information, where the preamble allocation information is used to indicate a preamble allocated to the terminal device. The method further includes: sending, by the terminal device, the preamble to the first radio access network device; receiving, by the terminal device, transmission resource information from the first radio access network device, where the transmission resource information indicates a transmission resource allocated by the first radio access network device to the terminal device; and sending, by the terminal device, the additional information to the first radio access network device by using the transmission resource.

In an embodiment, the method further includes: sending, by the terminal device, verification information of the terminal device to the first radio access network device.

According to yet another aspect, an embodiment of the present disclosure provides a communication method in a wireless network. The method includes: receiving, by a first core network device, a second message from a first radio access network device, where the second message includes a context identifier of a terminal device, and the context identifier includes an identifier of a second radio access network device and an identifier of the terminal device that is allocated by the second radio access network device; sending, by the first core network device, a third message to a second core network device or the second radio access network device, where the third message includes the context identifier; receiving, by the first core network device, context information of the terminal device from the second core network device or the second radio access network device, where the context information is associated with the identifier of the terminal device; and sending, by the first core network device, the context information to the first radio access network device. According to the communication method provided in this embodiment, a message between the first radio access network device and the second radio access network device can be forwarded by using a core network device, thereby ensuring timely and effective communication.

In an embodiment, the context identifier further includes PLMN information corresponding to the second radio access network device and/or an area identifier corresponding to the second radio access network device.

In an embodiment, the second message and the third message further include the PLMN information corresponding to the second radio access network device and/or the area identifier corresponding to the second radio access network device.

In an embodiment, the second message and the third message further include verification information of the terminal device and information about a serving cell in which the first radio access network device serves the terminal device.

In an embodiment, the second message further includes an identifier of the first radio access network device.

In an embodiment, the third message further includes at least one of the identifier of the first radio access network device, PLMN information corresponding to the first radio access network device, and an area identifier corresponding to the first radio access network device.

According to yet another aspect, an embodiment of the present disclosure provides a communication method in a wireless network. The method includes: receiving, by a second core network device from a first radio access network device or a first core network device, a fourth message that includes a context identifier of a terminal device, where the context identifier includes an identifier of a second radio access network device and an identifier of the terminal device that is allocated by the second radio access network device; sending, by the second core network device to the second radio access network device, a message that includes the context identifier; receiving, by the second core network device, context information of the terminal device from the second radio access network device, where the context information of the terminal device is associated with the identifier of the terminal device; and sending, by the second core network device, the context information to the first radio access network device or the first core network device. According to the communication method provided in this embodiment, a message between the first radio access network device and the second radio access network device can be forwarded by using a core network device, thereby ensuring timely and effective communication.

In an embodiment, the context identifier further includes PLMN information corresponding to the second radio access network device and/or an area identifier corresponding to the second radio access network device.

In an embodiment, the fourth message and the message that includes the context identifier further include the PLMN information corresponding to the second radio access network device and/or the area identifier corresponding to the second radio access network device.

In an embodiment, the fourth message further includes an identifier of the first radio access network device.

In an embodiment, the fourth message further includes verification information and information about a serving cell in which the first radio access network device serves the terminal device.

In an embodiment, the message that includes the context identifier further includes at least one of the identifier of the first radio access network device, PLMN information corresponding to the first radio access network device, and an area identifier corresponding to the first radio access network device, where the first radio access network device is an access network device that serves the terminal device.

In an embodiment, the method further includes: sending, by the second core network device to the second radio access network device, the verification information of the terminal device and the information about the serving cell in which the first radio access network device serves the terminal device.

According to yet another aspect, an embodiment of the present disclosure provides a radio access network device, and the radio access network device has a function of implementing an action of the first radio access network device in the foregoing methods. The radio access network device includes a receiver, a processor, and a transmitter. The receiver is configured to receive, from a terminal device, a first message that includes a context identifier. The processor is configured to decode the first message that includes the context identifier, where the context identifier includes an identifier of a second radio access network device and an identifier of the terminal device that is allocated by the second radio access network device. The transmitter is configured to send a second message to a core network device, where the second message includes the context identifier. The receiver is further configured to receive context information of the terminal device from the core network device, where the context information of the terminal device is associated with the identifier of the terminal device.

In an embodiment, the transmitter is further configured to send an area identifier request message to the terminal device. The receiver is further configured to receive, from the terminal device, an area identifier corresponding to the second radio access network device. The second message further includes the area identifier corresponding to the second radio access network device.

In an embodiment, the processor is further configured to determine, based on the context identifier, whether additional information needs to be obtained, where the additional information includes PLMN information corresponding to the second radio access network device and/or the area identifier corresponding to the second radio access network device. If the processor determines that the additional information needs to be obtained, the transmitter is further configured to send an additional-information request message to the terminal device. The receiver is further configured to receive the additional information from the terminal device. The second message further includes the additional information.

In an embodiment, the additional-information request message further includes preamble allocation information, where the preamble allocation information is used to indicate a preamble allocated to the terminal device. The receiver is further configured to receive the preamble from the terminal device. The processor is further configured to allocate a transmission resource to the terminal device. The transmitter is further configured to send the allocated transmission resource to the terminal device. The receiver receives, from the terminal device, the additional information sent by using the transmission resource.

In an embodiment, the receiver is further configured to receive verification information from the terminal device. The second message further includes the verification information and information about a serving cell in which the radio access network device serves the terminal device.

In an embodiment, the processor is further configured to determine, based on the identifier of the second radio access network device, whether an interface exists between the radio access network device and the second radio access network device. If the interface does not exist, the transmitter is configured to send the second message to the core network device.

According to yet another aspect, an embodiment of the present disclosure provides a radio access network device, and the radio access network device has a function of implementing an action of the second radio access network device in the foregoing methods. The radio access network device includes a processor, a transmitter, and a receiver. The processor is configured to allocate an identifier of a terminal device to the terminal device. The transmitter is configured to send a context identifier to the terminal device, where the context identifier includes an identifier of the radio access network device and the identifier of the terminal device. The receiver is configured to receive, from a core network device, a message that includes the context identifier. The processor is further configured to determine context information of the terminal device in response to the message that includes the context identifier, where the context information of the terminal device is associated with the identifier of the terminal device. The transmitter is further configured to send the context information of the terminal device to the core network device.

In an embodiment, the receiver is further configured to receive, from the core network device, verification information of the terminal device and information about a serving cell in which a first radio access network device serves the terminal device. The processor is further configured to verify the terminal device based on the verification information and the information about the serving cell.

In an embodiment, before the receiver receives, from the core network device, the message that includes the context identifier, the transmitter is further configured to send control information to the terminal device. The control information is used to instruct the terminal device to enter a light connection mode.

Functions of units in the radio access network devices in the foregoing aspects may be further implemented by executing corresponding software by hardware.

According to yet another aspect, an embodiment of the present disclosure provides a terminal device, and the terminal device performs the communication method in a wireless network in the foregoing aspects. The terminal device includes a receiver, a processor, and a transmitter. The receiver is configured to receive a context identifier from a second radio access network device. The processor is configured to decode the context identifier, where the context identifier includes an identifier of the second radio access network device and an identifier of the terminal device that is allocated by the second radio access network device. The transmitter is configured to send a first message to a first radio access network device, where the first message includes the context identifier.

In an embodiment, before the transmitter is configured to send the first message to the first radio access network device, the receiver is further configured to receive the second area identifier of the second radio access network device and a first area identifier of the first radio access network device. The processor is further configured to determine whether the second area identifier is the same as the first area identifier.

In an embodiment, the receiver is further configured to receive an area identifier request message sent by the first radio access network device. The processor is configured to: in response to the area identifier request message, control the transmitter to send the second area identifier to the first radio access network device.

In an embodiment, the processor is further configured to truncate the context identifier according to an instruction of the first radio access network device, where the first message includes a part of the context identifier obtained after the truncation.

In an embodiment, the receiver is further configured to receive an additional-information request message from the first radio access network device, where additional information includes at least one of the area identifier corresponding to the second radio access network device, PLMN information corresponding to the second radio access network device, and another remaining part of the context identifier obtained after the truncation. The processor is further configured to: in response to the additional-information request message, control the transmitter to send the additional information to the first radio access network device.

In an embodiment, the processor is further configured to decode the additional-information request message, where the additional-information request message further includes preamble allocation information, and the preamble allocation information is used to indicate a preamble allocated to the terminal device. The transmitter is further configured to send the preamble to the first radio access network device.

The receiver is further configured to receive transmission resource information from the first radio access network device, where the transmission resource information indicates a transmission resource allocated by the first radio access network device to the terminal device. The transmitter is further configured to send the additional information to the first radio access network device by using the transmission resource.

In an embodiment, the transmitter is further configured to send verification information of the terminal device to the first radio access network device.

Functions of units in the terminal device may be further implemented by executing corresponding software by hardware.

According to yet another aspect, an embodiment of the present disclosure provides a core network device, and the core network device has a function of implementing an action of the first core network device in the foregoing methods. The core network device includes a receiver, a processor, and a transmitter. The receiver is configured to receive a second message from a first radio access network device. The processor is configured to decode the second message. The second message includes a context identifier of a terminal device. The context identifier includes an identifier of a second radio access network device and an identifier of the terminal device that is allocated by the second radio access network device. The transmitter is configured to send a third message to a second core network device or the second radio access network device, where the third message includes the context identifier. The receiver is further configured to receive context information of the terminal device from the second core network device or the second radio access network device, where the context information is associated with the identifier of the terminal device. The transmitter is further configured to send the context information to the first radio access network device.

According to yet another aspect, an embodiment of the present disclosure provides a core network device, and the core network device has a function of implementing an action of the second core network device in the foregoing methods. The core network device includes a receiver, a processor, and a transmitter. The receiver is configured to receive a fourth message from a first radio access network device or a first core network device. The processor is configured to decode the fourth message. The fourth message includes a context identifier of a terminal device, and the context identifier includes an identifier of a second radio access network device and an identifier of the terminal device that is allocated by the second radio access network device. The transmitter is configured to send, to the second radio access network device, a message that includes the context identifier. The receiver is further configured to receive context information of the terminal device from the second radio access network device, where the context information of the terminal device is associated with the identifier of the terminal device. The transmitter is further configured to send the context information to the first radio access network device or the first core network device.

In an embodiment, the transmitter is further configured to send, to the second radio access network device, verification information of the terminal device and information about a serving cell in which the first radio access network device serves the terminal device.

Functions of units in the core network devices in the foregoing aspects may be further implemented by executing corresponding software by hardware.

According to yet another aspect, an embodiment of the present disclosure provides a communications system, and the communications system includes the radio access network device, the terminal device, and the core network device described in the foregoing aspects.

According to yet another aspect, an embodiment of the present disclosure provides a computer storage medium, configured to store a computer software instruction used by the foregoing radio access network device, and the computer software instruction includes a program designed for performing the foregoing aspects.

According to yet another aspect, an embodiment of the present disclosure provides a computer storage medium, configured to store a computer software instruction used by the foregoing terminal device, and the computer software instruction includes a program designed for performing the foregoing aspects.

According to yet another aspect, an embodiment of the present disclosure provides a computer storage medium, configured to store a computer software instruction used by the foregoing core network device, and the computer software instruction includes a program designed for performing the foregoing aspects.

According to the technical solutions provided in the embodiments of the present disclosure, the first radio access network device and the second radio access network device communicate with each other by using a core network device, to ensure that communication can still be performed in a timely and effective manner when no available interface exists between the first radio access network device and the second radio access network device, thereby improving working efficiency of a system.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other accompanying drawings from these accompanying drawings in a proper range.

DESCRIPTION OF EMBODIMENTS

The technical solutions in the embodiments of the present disclosure are clearly described in the following with reference to the accompanying drawings. Apparently, the described embodiments are merely some but not all of the embodiments of the present disclosure. It may be understood that, without any ambiguity or contradiction, another embodiment obtained by a person of ordinary skill in the art by combining technical features in the embodiments or among the embodiments also falls within the protection scope of the present disclosure.

Figure 1A:
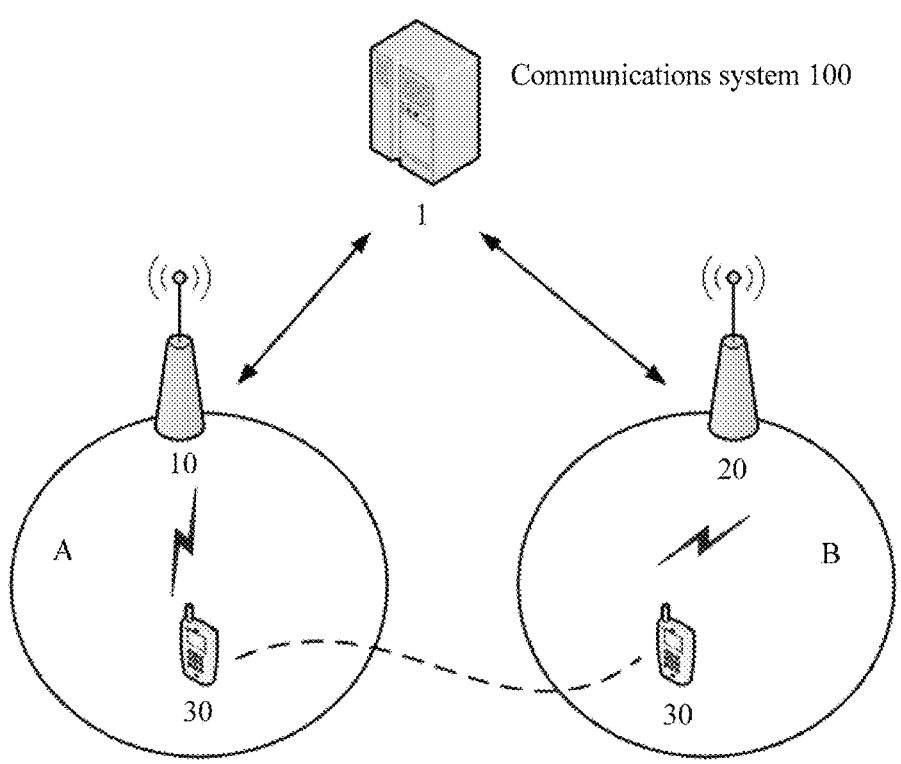
FIG. 1A is a schematic diagram of a possible communications network scenario according to an embodiment of the present disclosure.
Figure 1B:
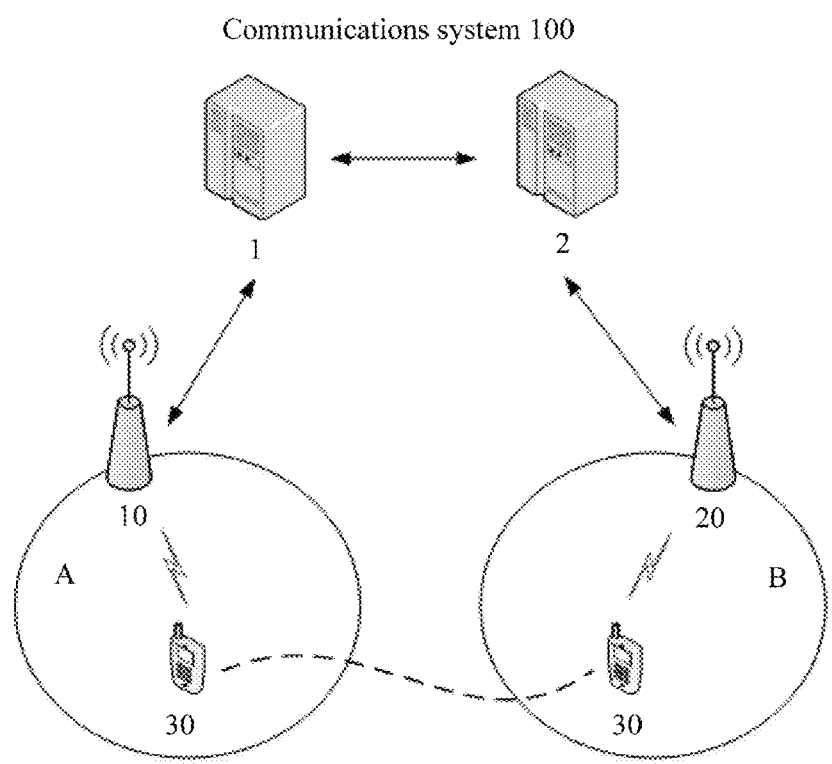
FIG. 1B is a schematic diagram of another possible communications network scenario according to an embodiment of the present disclosure.

The solutions provided in the embodiments of the present disclosure are based on a communications system 100 shown in FIG. 1A or FIG. 1B. The communications system 100 includes at least one core network device, at least two radio access network (RAN) devices, and at least one terminal device. Each radio access network device covers at least one cell. The at least two radio access network devices include one anchor radio access network device and at least one serving radio access network device. Each of the radio access network devices is connected to the core network device by using a communications interface. The communications interface may be an S1 interface. The core network device may be a device that has a mobility management function.

The anchor radio access network device may instruct the terminal device to enter a light connection mode, and allocate a context identifier to the terminal device. The light connection mode may be a sub-state of a radio resource control (RRC) connected mode, or may be an enhanced state of an idle mode, or may be an independent state. The light connection mode may also be referred to as an inactive state, a deactivated state, a low active state, a low overhead state, or the like. A form and a name of the light connection mode are not specifically limited in the embodiments of the present disclosure. The terminal device that is in a light connection mode stores context information, and has mobility for performing cell reselection.

Both the anchor radio access network device and the terminal device that enters a light connection mode store context information of the terminal device. The context information may include a configuration parameter of a connection between the anchor radio access network device and the terminal device.

If the terminal device that enters a light connection mode does not change a camped cell, when the terminal device has a data transmission requirement, the terminal device may restore an RRC connection to the anchor radio access network device by using the stored context information, thereby avoiding signaling overloads in an RRC connection re-establishment process.

If the terminal device that enters a light connection mode changes a camped cell, the anchor radio access network device does not need to give a handover instruction, and the terminal device determines, based on a cell reselection criterion, a cell to be camped on. For example, when finding a cell with better signal quality or higher signal strength, the terminal device may select to camp on the cell. In the cell to be camped on, the terminal device is served by a serving radio access network device. When the terminal device has a data transmission requirement, the terminal device may establish an RRC connection to the serving radio access network device, to obtain a data transmission service provided by the serving radio access network device.

Specifically, as shown in FIG. 1A and FIG. 1B, the communications system 100 includes a radio access network device 10, a radio access network device 20, and a terminal device 30. The radio access network device 10 is an anchor radio access network device, and the radio access network device 20 is a serving radio access network device. The radio access network device 10 controls a cell A. The radio access network device 20 controls a cell B. It may be understood that the radio access network device 10 and the radio access network device 20 may control more cells other than the cell A and the cell B. The terminal device 30 enters a light connection mode under an instruction of the radio access network device 10. Afterwards, the terminal device 30 moves to the cell B. In the cell B, the radio access network device 20 provides a data transmission service for the terminal device.

In the solutions of the embodiments of the present disclosure, there is a communications interface between the radio access network device 10 and a core network device, and there is a communications interface between the radio access network device 20 and the same core network device. For example, the communications interface is an S1 interface. Therefore, both the radio access network device 10 and the radio access network device 20 may be controlled by the same core network device. For example, in the communications system 100 shown in FIG. 1A, there is a communications interface between the radio access network device 10 and a core network device 1, and there is a communications interface between the radio access network device 20 and the core network device 1. Therefore, both the radio access network device 10 and the radio access network device 20 may be controlled by the core network device 1.

In the solutions of the embodiments of the present disclosure, there may be a communications interface between the radio access network device 10 and one core network device, and there may be a communications interface between the radio access network device 20 and another core network device. Therefore, the radio access network device 10 and the radio access network device 20 are controlled separately by different core network devices. For example, in the communications system 100 shown in FIG. 1B, there is a communications interface between the radio access network device 10 and a core network device 1, and there is a communications interface between the radio access network device 20 and a core network device 2.

Generally, each core network device is responsible for managing at least one mobility management area. For example, the mobility management area may be a tracking area (TA), and each core network device is corresponding to at least one tracking area. Each TA may be corresponding to a tracking area code (TAC), and the TAC may be used to identify the corresponding TA. Certainly, the area may alternatively be a routing area (RA) corresponding to a routing area code (RAC), or a location area (LA) corresponding to a location area code (LAC). The core network device 1 may communicate with the core network device 2.

In the embodiments of the present disclosure, the communications system 100 may be a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD) system, a universal mobile telecommunication system (UMTS), and another wireless communications system in which an orthogonal frequency division multiplexing (OFDM) technology is used. A system architecture and a service scenario that are described in the embodiments of the present disclosure are intended to describe the technical solutions of the embodiments of the present disclosure more clearly, and constitute no limitation on the technical solutions provided in the embodiments of the present disclosure. A person of ordinary skill in the art may know that as network architectures evolve and a new service scenario emerges, the technical solutions provided in the embodiments of the present disclosure are also applicable to a similar technical problem.

In the embodiments of the present disclosure, the radio access network device (for example, the radio access network devices 10 and 20) may be configured to provide a wireless communication function for the terminal device. The radio access network device may include a macro base station, a micro base station (also referred to as a small cell), a relay station, an access point, and the like that are in various forms. The radio access network device may be a base transceiver station (BTS) in GSM or CDMA, a NodeB (NB) in WCDMA, an evolved NodeB (eNB or eNodeB) in LTE, or a corresponding next generation NodeB (gNB) in a 5G network. For ease of description, in all the embodiments of the present disclosure, the foregoing apparatuses that provide a wireless communication function for the terminal device are collectively referred to as radio access network devices.

In the embodiments of the present disclosure, the terminal device (for example, the terminal device 30) may also be referred to as user equipment (user equipment, UE), a mobile station (MS), a mobile terminal, or the like, and the terminal device may communicate with one or more core networks by using a radio access network (RAN). For example, the terminal device may be a mobile phone (or referred to as a "cellular phone"), a computer with a mobile terminal, or the like. For example, the terminal device may alternatively be a portable, pocket-sized, handheld, computer built-in, or in-vehicle mobile apparatus, which exchanges voice and/or data with the radio access network. This is not specifically limited in the embodiments of the present disclosure.

In the embodiments of the present disclosure, the core network device controls one or more radio access network devices, and may perform centralized management on resources in a system, or may configure a resource for the terminal device. For example, the radio access network device may be a NodeB and a radio network controller (RNC) in the UMTS, and the core network device may be a serving GPRS support node (SGSN) and a gateway GPRS support node (GGSN). For another example, the radio access network device may be an eNB in the LTE system, and the core network device may be a mobility management entity (MME). For another example, the core network device may be a wireless network inter-RAT coordinating controller, or the like. This is not specifically limited in the embodiments of the present disclosure.

It should be noted that a quantity of network elements included in the communications system 100 shown in FIG. 1A and FIG. 1B is merely an example, and the embodiments of the present disclosure are not limited thereto. In addition, although the core network devices 1 and 2, the radio access network devices 10 and 20, and the terminal device 30 are shown in the communications system 100 shown in FIG. 1A or FIG. 1B, network elements included the communications system 100 may not be limited to the foregoing network elements. For example, the communications system 100 may further include a device configured to carry a virtualized network function. Details are not described herein.

When the terminal device needs to establish an RRC connection to the serving radio access network device, the serving radio access network device may obtain the context information of the terminal device from the anchor radio access network device. Therefore, the serving radio access network device needs to communicate with the anchor radio access network device, to complete transfer of the context information.

Generally, an interface is configured between radio access network devices. Communication is implemented between the anchor radio access network device and the serving radio access network device by using a configured interface. However, due to reasons such as area division or low power, no communications interface may be configured between radio access network devices, or an interface between radio access network devices may be unavailable. In this case, communication cannot be implemented between the anchor radio access network device and the serving radio access network device. Consequently, the terminal device cannot obtain a data transmission service in a timely manner after a cell reselection, and working efficiency is reduced.

Based on the foregoing technical problem, according to a communication method in a wireless network provided in the embodiments of the present disclosure, when communication cannot be directly performed between the anchor radio access network device and the serving radio access network device by using an interface, message processing is performed according to the method in the embodiments of the present disclosure by using the core network device, to ensure timely and effective information obtaining and data transmission, thereby improving working efficiency. Certainly, based on the communication method in a wireless network provided in the embodiments of the present disclosure, regardless of whether a communications interface exists between the anchor radio access network device and the serving radio access network device, the method provided in the embodiments of the present disclosure can be used, to implement process uniformity in different cases.

For ease of description and to avoid unnecessary restrictions, the serving radio access network device is referred to as a first radio access network device, and the anchor radio access network device is referred to as a second radio access network device below.

Figure 2:
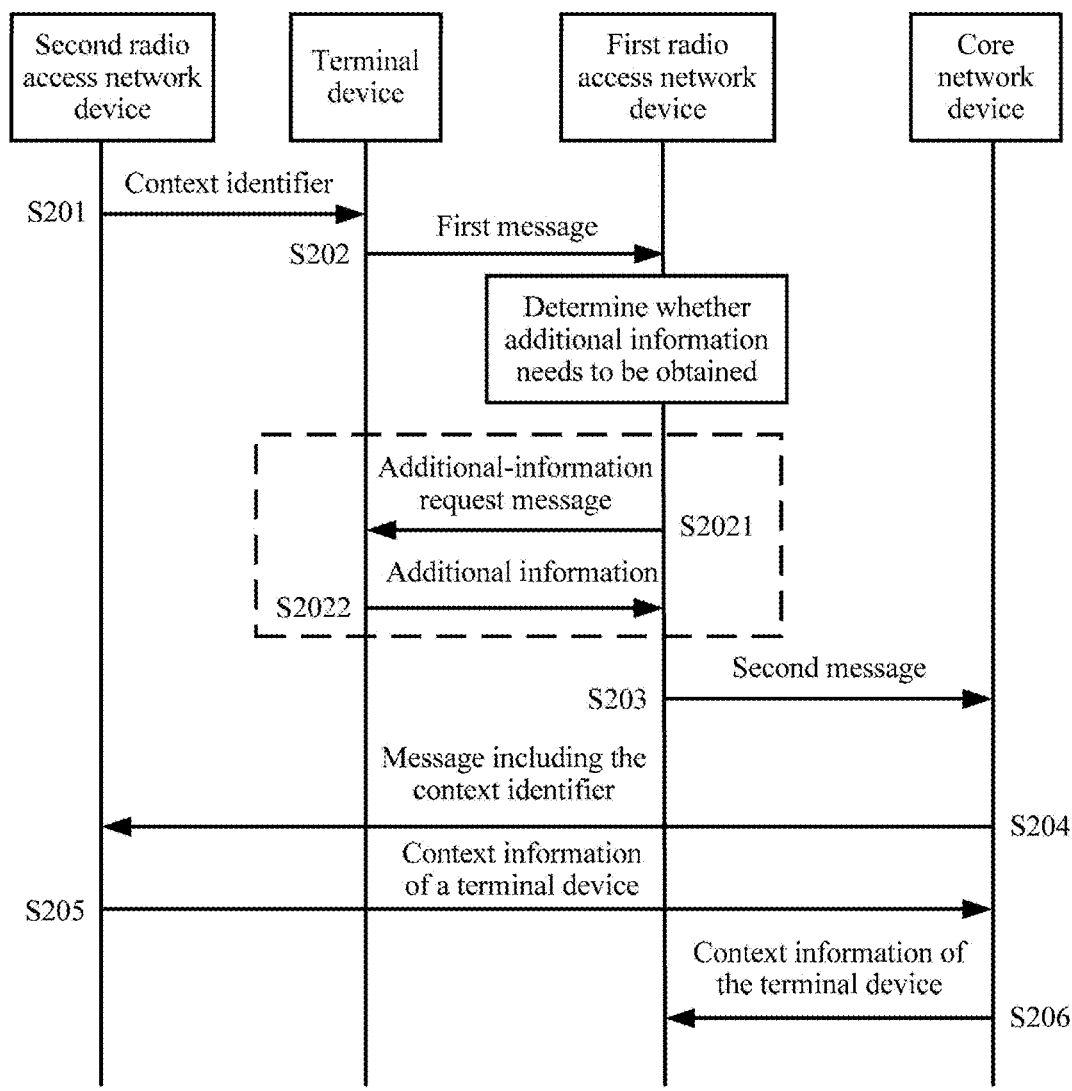
FIG. 2 is a schematic diagram of a communication method according to an embodiment of the present disclosure.

FIG. 2 is a schematic diagram of a communication method in a wireless network according to an embodiment of the present disclosure. In this embodiment, as shown in FIG. 1A, the first radio access network device and the second radio access network device are controlled by a same core network device. The method provided in this embodiment is described in detail below from a perspective of interaction with reference to FIG. 2.

S201. The second radio access network device sends a context identifier to a terminal device.

The context identifier includes an identifier of the second radio access network device and an identifier of the terminal device that is allocated by the second radio access network device. The context identifier may be used to identify the terminal device, or may be used to identify context information of the terminal device.

The context identifier may be an independent identifier that includes continuous character strings. The context identifier may be used to uniquely identify the terminal device within a local range, for example, uniquely identify the terminal device within a tracking area or a public land mobile network (PLMN). The context identifier may also be used to uniquely identify the terminal device globally.

The context identifier may include continuous character strings that include the identifier of the second radio access network device and the identifier of the terminal device. The context identifier may alternatively include discontinuous character strings that include the identifier of the second radio access network device and the identifier of the terminal device. The identifier of the second radio access network device that is included in the context identifier may include an identifier of an area and an identifier of the second radio access network device in the area. This is not specifically limited in this embodiment of the present disclosure.

Optionally, the context identifier further includes PLMN information corresponding to the second radio access network device and/or an area identifier corresponding to the second radio access network device. The area identifier may be a tracking area code (TAC), a routing area code (RAC), or a location area code (LAC). The PLMN information corresponding to the second radio access network device and/or the area identifier corresponding to the second radio access network device are/is used to determine globally a core network device corresponding to the second radio access network device.

Optionally, the second radio access network device sends control information to the terminal device, to instruct the terminal device to enter a light connection mode. The second radio access network device and the terminal device each store the context information of the terminal device. The context information of the terminal device is associated with the identifier of the terminal device.

The context information may include a configuration parameter of a connection between the second radio access network device and the terminal device. Specifically, the configuration parameter of a connection may include a radio bearer configuration of the terminal device, and the radio bearer configuration includes a signaling radio bearer configuration and/or a data radio bearer configuration. The context information may further include key information, and the key information is used during encrypted transmission or during generation of verification information of the terminal device.

S202. The terminal device receives the context identifier from the second radio access network device, and sends, to a first radio access network device, a first message that includes the context identifier.

Specifically, the terminal device camps, based on cell reselection, on a cell in which the first radio access network device provides a service. The terminal device may send, to the first radio access network device, the first message that includes the context identifier for the following reason: The terminal device needs to report, to the second radio access network device, information about the cell in which the terminal device is currently located; or the terminal device needs the first radio access network device to provide a data transmission service.

Optionally, when sending the context identifier to the first radio access network device by using the first message, the terminal device truncates the context identifier according to an instruction of the first radio access network device, and sends only a part of the context identifier obtained after the truncation. This is because when the complete context identifier is sent, the first message may be excessively large, and consequently the terminal device cannot successfully send the first message when signal quality is relatively poor. Therefore, to ensure that the first message can be successfully sent, the first radio access network device may instruct the terminal device to send only the part of the context identifier obtained after the truncation. For example, the context identifier is 40 bits, and the first radio access network device may instruct the terminal device to send only 24 bits.

The first message may further include the PLMN information corresponding to the second radio access network device and/or the area identifier corresponding to the second radio access network device. The PLMN information corresponding to the second radio access network device and/or the area identifier corresponding to the second radio access network device may be carried in the first message in a manner of being included in the context identifier, or may be carried in the first message in a manner of being independent of the context identifier.

Optionally, the terminal device obtains a PLMN corresponding to the second radio access network device. After moving to the cell in which the first radio access network device provides a service, the terminal device determines, based on a PLMN broadcast in the cell, the PLMN information of the second radio access network device. For example, the PLMN corresponding to the second radio access network device is 103, PLMNs broadcast in the cell in which the first radio access network device provides a service include 101, 102, 103, and 104, and four pieces of PLMN information respectively corresponding to the four PLMNs are 0, 1, 2, and 3. In this case, the PLMN information added to the first message by the terminal device is 2. Therefore, the first radio access network device determines that the PLMN corresponding to the second radio access network device is 103. In this way, the first message can be simplified, and a success rate of sending the first message is ensured.

Optionally, the first message further includes area identifier indication information. The area identifier indication information is used to indicate whether an area identifier corresponding to the first radio access network device is the same as the area identifier corresponding to the second radio access network device. In this embodiment, the area identifier indication information indicates that the area identifier corresponding to the first radio access network device is the same as the area identifier corresponding to the second radio access network device. For example, the area identifier corresponding to the second radio access network device is 1235, and the area identifier corresponding to the first radio access network device is also 1235. In this case, the terminal device sets a value of the area identifier indication information to "same", and sends the area identifier indication information to the first radio access network device. The first radio access network device determines, based on the area identifier indication information, that the area identifier corresponding to the second radio access network device is 1235.

Optionally, the terminal device further sends the verification information to the first radio access network device. The terminal device may send the verification information together with the first message, where the verification information is used as an independent message. Alternatively, the terminal device may add the verification information to the first message for sending. The verification information is used by the second radio access network device to verify the terminal device.

S203. The first radio access network device receives the first message sent by the terminal device, and sends a second message to a core network device, where the second message includes the context identifier.

After receiving the first message, the first radio access network device decodes the first message, to obtain information carried in the first message.

Optionally, the first radio access network device determines, based on the context identifier included in the first message, whether to request the terminal device to send additional information. The additional information includes at least one of the area identifier corresponding to the second radio access network device, the PLMN information corresponding to the second radio access network device, and another remaining part of the context identifier obtained after the truncation. For example, the first radio access network device determines whether the area identifier and/or the PLMN information corresponding to the second radio access network device are/is stored. If the first radio access network device determines that the area identifier and/or the PLMN information corresponding to the second radio access network device are/is not stored, the first radio access network device determines that the area identifier and/or the PLMN information corresponding to the second radio access network device need/needs to be obtained. For another example, the first radio access network device determines, based on the identifier of the second radio access network device, whether an interface exists between the first radio access network device and the second radio access network device. If the interface does not exist, the first radio access network device determines that the area identifier and/or the PLMN information corresponding to the second radio access network device need/needs to be obtained. In another optional manner, when the first message further includes the area identifier indication information, the first radio access network device determines that the additional information needs to be obtained.

If the first radio access network device determines that the additional information needs to be obtained, the following optional steps are performed.

S2021. The first radio access network device sends an additional-information request message to the terminal device.

Specifically, the additional-information request message is sent to the terminal device through a common control channel. The additional-information request message may include preamble allocation information of the terminal device. The preamble allocation information indicates a preamble allocated by the first radio access network device to the terminal device. Therefore, the terminal device may send the additional information based on the preamble allocation information.

The additional-information request message may further include indication information. The indication information includes at least one of PLMN request information, area identifier request information, and request information of the another remaining part of the context identifier obtained after the truncation. The terminal device determines, based on the indication information, information that needs to be sent.

S2022. The terminal device receives the additional-information request message, and sends the additional information to the first radio access network device based on the additional-information request message.

Specifically, the terminal device sends the preamble to the first radio access network device based on the preamble allocation information. Based on the preamble, the first radio access network device allocates a transmission resource to the terminal device, and sends transmission resource information. The terminal device sends the additional information by using the transmission resource. The additional information may be included in a message for sending. The message that includes the additional information is sent to the first radio access network device through the common control channel.

Optionally, the first radio access network device combines, into the complete context identifier, the part of the context identifier that is obtained after the truncation and that is included in the first message, and the another remaining part of the context identifier that is obtained after the truncation and that is obtained by using the additional information. The first radio access network device adds the complete context identifier to the second message.

The second message may further include the PLMN information corresponding to the second radio access network device and/or the area identifier corresponding to the second radio access network device. The PLMN information corresponding to the second radio access network device and/or the area identifier corresponding to the second radio access network device may be included in the context identifier, or may be included in the first message and carried in the second message in a manner of being independent of the context identifier. The PLMN information corresponding to the second radio access network device and/or the area identifier corresponding to the second radio access network device may alternatively be obtained by the first radio access network device by using the additional information, and carried in the second message.

The area identifier corresponding to the second radio access network device that is included in the second message may alternatively be determined by the first radio access network device based on the indication information in the first message, and carried in the second message.

Optionally, the first radio access network device stores the PLMN information corresponding to the second radio access network device and/or the area identifier corresponding to the second radio access network device. The first radio access network device adds, to the second message, the stored PLMN information corresponding to the second radio access network device and/or the stored area identifier corresponding to the second radio access network device.

Optionally, the second message further includes the verification information and information about a serving cell in which the first radio access network device serves the terminal device. The information about the serving cell may include at least one of a physical cell identifier (PCI) of the serving cell, a frequency band of the serving cell, and a E-UTRAN cell global identifier (ECGI) of the serving cell. The information about the serving cell and the verification information are used by the second radio access network device to verify the terminal device.

Optionally, the second message further includes an identifier of the first radio access network device. Therefore, the core network device can determine a sender of the second message. After receiving a return message, the core network device can accurately send back the return message to the first radio access network device.

The second message further includes the identifier of the second radio access network device. The second message may include a content part and a routing information part. The identifier of the second radio access network device may be included in the routing information part of the second message. Therefore, the core network device may know a receiver of the second message without reading the context identifier included in the second message.

An advantage of the foregoing actions is that the sender and/or the receiver of the second message are/is directly marked, so that a probability of a message forwarding failure is reduced.

It can be understood that the second message may alternatively not include the identifier of the first radio access network device and the identifier of the second radio access network device, and the core network device determines the sender and the receiver. In this way, when accuracy is ensured, message content can be simplified, transmission efficiency can be improved, and network resources can be saved.

Optionally, the first radio access network device determines, based on the identifier of the second radio access network device, whether an interface exists between the first radio access network device and the second radio access network device. For example, the first radio access network device may determine, based on an internally stored radio access network device list, whether an interface exists. Alternatively, the first radio access network device determines availability of the interface between the first radio access network device and the second radio access network device based on an internally stored configuration parameter. When the interface does not exist between the first radio access network device and the second radio access network device, the first radio access network device sends the second message to the core network device.

S204. The core network device receives the second message, and sends, to the second radio access network device, a third message that includes the context identifier.

Optionally, the third message further includes the PLMN information corresponding to the second radio access network device and/or the area identifier corresponding to the second radio access network device. The PLMN information corresponding to the second radio access network device and/or the area identifier corresponding to the second radio access network device may be included in the context identifier, or may be included in the second message and carried in the third message in a manner of being independent of the context identifier.

Optionally, the third message further includes at least one of the identifier of the first radio access network device, PLMN information corresponding to the first radio access network device, and the area identifier corresponding to the first radio access network device. The foregoing information is used by the core network device to determine the first radio access network device when sending a return message.

Optionally, the method may further include step S2041, to be specific, the core network device sends, to the second radio access network device, the verification information of the terminal device and the information about the serving cell in which the first radio access network device serves the terminal device. The foregoing information may be included in the third message for sending, or may be sent in a manner of being independent of the third message.

S205. The second radio access network device sends context information of the terminal device to the core network device based on the third message that includes the context identifier.

The context information of the terminal device is associated with the identifier of the terminal device.

The context information may further include an acknowledgement message, and the acknowledgement message is used to feed back, to the first radio access network device, information that the second radio access network device has learned of a current location of the terminal device.

The context information may further include a connection configuration parameter used for establishing an RRC connection between the terminal device and the first radio access network device.

Optionally, the second radio access network device further receives the verification information and the information about the serving cell in which the first radio access network device serves the terminal device, and verifies the terminal device based on the verification information and the information about the serving cell, where the verification information and the information about the serving cell are sent by the core network device.

S206. The core network device sends the context information to the first radio access network device.

Optionally, the first radio access network device determines, based on the context information, that the second radio access network device has learned of the current location of the terminal device.

Optionally, the first radio access network device establishes the RRC connection to the terminal device by using the context information, and provides a data transmission service for the terminal device.

It should be noted that steps S205 and S206 are optional steps.

In this embodiment of the present disclosure, when no available interface exists between the first radio access network device and the second radio access network device, communication between the radio access network devices can still be implemented by using the core network device as a message transfer medium, thereby improving working efficiency of a system.

Figure 3:
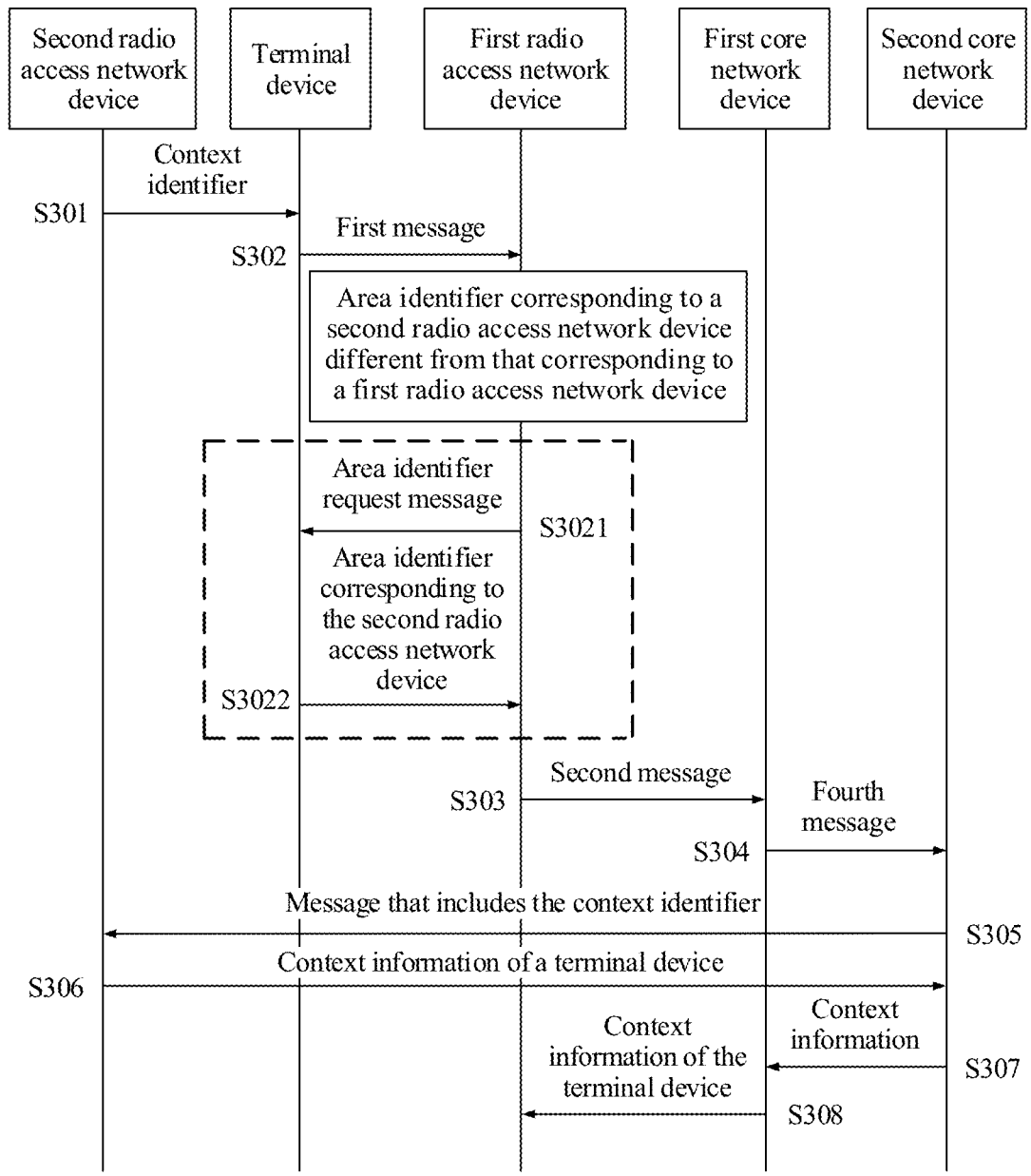
FIG. 3 is a schematic diagram of a communication method according to another embodiment of the present disclosure.

FIG. 3 is a schematic diagram of a communication method in a wireless network according to another embodiment of the present disclosure. In this embodiment, as shown in FIG. 1B, the first radio access network device and the second radio access network device are respectively controlled by different core network devices. In this embodiment, the first radio access network device is controlled by a first core network device, and the second radio access network device is controlled by a second core network device. The method provided in this embodiment is described in detail below from a perspective of interaction with reference to FIG. 3.

S301. The second radio access network device sends a context identifier to a terminal device.

S302. The terminal device receives the context identifier from the second radio access network device, and sends, to a first radio access network device, a first message that includes the context identifier.

Optionally, the first message includes indication information. The indication information is used to indicate whether an area identifier corresponding to the first radio access network device is the same as an area identifier corresponding to the second radio access network device. In this embodiment, the indication information indicates that the area identifier corresponding to the first radio access network device is different from the area identifier corresponding to the second radio access network device. For example, the area identifier corresponding to the second radio access network device is 1236, and the area identifier corresponding to the first radio access network device is 1235. In this case, the terminal device sets a value of the indication information to "different", and sends the indication information to the first radio access network device.

S303. The first radio access network device receives the first message sent by the terminal device, and sends a second message to the first core network device, where the second message includes the context identifier.

After receiving the first message, the first radio access network device decodes the first message, to obtain information carried in the first message.

Optionally, the first radio access network device determines, based on the indication information included in the first message, that the area identifier corresponding to the second radio access network device is different from the area identifier corresponding to the first radio access network device. In this case, the first radio access network device needs to learn of the complete area identifier corresponding to the second radio access network device. Therefore, the first radio access network device performs the following steps.

S3021. The first radio access network device sends an area identifier request message to the terminal device.

S3022. The terminal device receives the area identifier request message, and sends, to the first radio access network device, an area identifier corresponding to the second radio access network device.

Therefore, the first radio access network device obtains, by using the foregoing process, the area identifier corresponding to the second radio access network device, and adds the area identifier to the second message.

S304. The first core network device receives the second message, and sends, to a second core network device, a fourth message that includes the context identifier.

Optionally, the fourth message further includes PLMN information corresponding to the second radio access network device and/or the area identifier corresponding to the second radio access network device. The PLMN information corresponding to the second radio access network device and/or the area identifier corresponding to the second radio access network device are/is included in the context identifier, or are/is included in the second message and carried in the fourth message in a manner of being independent of the context identifier.

The fourth message may further include an identifier of the first radio access network device. Therefore, after receiving a return message, the first core network device and the second core network device can accurately send back the return message to the first radio access network device.

Optionally, the fourth message further includes verification information and information about a serving cell in which the first radio access network device serves the terminal device.

S305. The second core network device receives the fourth message, and sends, to the second radio access network device, a message that includes the context identifier.

S306. The second radio access network device sends context information of the terminal device to the second core network device based on the message that includes the context identifier.

S307. The second core network device sends the context information to the first core network device.

S308. The first core network device sends the context information to the first radio access network device.

It should be noted that for related content that is not described in detail in steps S301 to S308, refer to a corresponding part in steps S201 to S206 in the method shown in FIG. 2. Details are not described herein again. Steps S306 to S308 are optional steps.

In this embodiment of the present disclosure, when no available interface exists between the first radio access network device and the second radio access network device, communication between the radio access network devices can still be implemented by using respective core network devices as message transfer media, thereby improving working efficiency of a system.

The foregoing mainly describes the solutions provided in the embodiments of the present disclosure from a perspective of interaction between devices. It can be understood that, to implement the foregoing functions, each device such as the terminal device, the access network device, and the core network device includes corresponding hardware structures and/or software modules for executing functions. A person skilled in the art should be readily aware that, in combination with the examples described in the embodiments disclosed in this specification, units and algorithms steps can be implemented by hardware or a combination of hardware and computer software in the present disclosure. Whether a function is performed by hardware or computer software driving hardware depends on particular applications and design constraints of the technical solutions. A person skilled in the art may use different methods to implement the described functions for each particular application, but it should not be considered that the implementation goes beyond the scope of the present disclosure.

Figure 4:
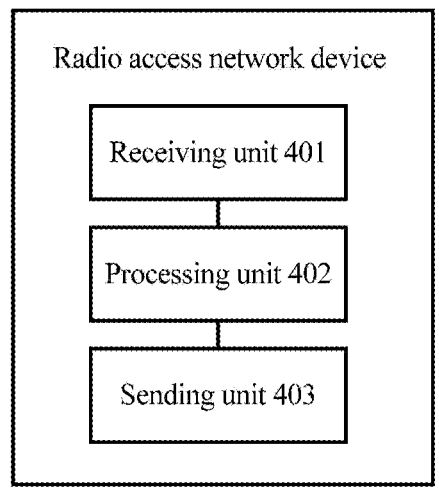
FIG. 4 is a possible schematic structural diagram of a radio access network device according to an embodiment of the present disclosure.

FIG. 4 is a possible schematic structural diagram of the radio access network device in the foregoing embodiments. It should be noted that the radio access network device can perform the methods in the foregoing embodiments. Therefore, for specific details of the radio access network device, refer to the descriptions in the foregoing embodiments. For brevity, same content is not described again below. The radio access network device may be the radio access network device 10 shown in FIG. 1A or FIG. 1B. The radio access network device is a first radio access network device that serves a terminal device. The radio access network device includes a receiving unit 401, a processing unit 402, and a sending unit 403.

The receiving unit 401 is configured to receive, from a terminal device, a first message that includes a context identifier.

The processing unit 402 is configured to decode the first message that includes the context identifier. The context identifier includes an identifier of a second radio access network device and an identifier of the terminal device that is allocated by the second radio access network device.

The sending unit 403 is configured to send a second message to a core network device. The second message includes the context identifier.

The receiving unit 401 is further configured to receive context information of the terminal device from the core network device. The context information of the terminal device is associated with the identifier of the terminal device.

The terminal device is configured to: truncate the context identifier based on an instruction of the radio access network device, and send only a part that is of the context identifier and that is obtained after the truncation.

Optionally, the processing unit 402 is further configured to decode the context identifier, to obtain PLMN information corresponding to the second radio access network device and/or an area identifier corresponding to the second radio access network device that are/is included in the context identifier. The area identifier may be a TAC, an RAC, or an LAC.

The processing unit 402 may be further configured to decode the first message, to obtain the PLMN information corresponding to the second radio access network device and/or the area identifier corresponding to the second radio access network device that are/is included in the first message. Same as that described in step S202 shown in FIG. 2, the PLMN information corresponding to the second radio access network device and/or the area identifier corresponding to the second radio access network device may be carried in the first message in a manner of being included in the context identifier, or may be carried in the first message in a manner of being independent of the context identifier.

Optionally, the processing unit 402 is further configured to obtain, by decoding the first message, the PLMN information corresponding to the second radio access network device. Specifically, the processing unit 402 may obtain, by using the method described in step S202 shown in FIG. 2, a PLMN corresponding to the second radio access network device. Details are not described herein again.

Optionally, the processing unit 402 is further configured to obtain indication information by decoding the first message. The indication information indicates whether an area identifier corresponding to the first radio access network device is the same as the area identifier corresponding to the second radio access network device. If the indication information indicates that the area identifier corresponding to the first radio access network device is the same as the area identifier corresponding to the second radio access network device, the processing unit 402 determines that the area identifier corresponding to the second radio access network device is an area identifier corresponding to a current radio access network device. If the indication information indicates that the area identifier corresponding to the first radio access network device is different from the area identifier corresponding to the second radio access network device, the processing unit 402 may control execution of the following operations by using the method described in step S303 shown in FIG. 3, to obtain the complete area identifier corresponding to the second radio access network device: The sending unit 403 is further configured to send an area identifier request message to the terminal device, and the receiving unit 401 is further configured to receive, from the terminal device, the area identifier corresponding to the second radio access network device.

Optionally, the processing unit 402 is further configured to determine, based on the context identifier, whether the radio access network device needs to request the terminal device to send additional information. The additional information includes at least one of the area identifier corresponding to the second radio access network device, the PLMN information corresponding to the second radio access network device, and another remaining part of the context identifier obtained after the truncation. For example, the processing unit 402 may determine, by determining whether the area identifier and/or the PLMN information corresponding to the second radio access network device are/is stored, whether the additional information needs to be obtained.

If the processing unit 402 determines that the additional information needs to be obtained, the processing unit 402 may control execution of the following operations by using the method described in step S203 shown in FIG. 2.

The sending unit 403 is further configured to send an additional-information request message to the terminal device. The sending unit 403 may send the additional-information request message through a common control channel. The processing unit 402 may further add preamble allocation information of the terminal device to the additional-information request message. The preamble allocation information indicates a preamble allocated by the processing unit 402 to the terminal device. The processing unit 402 may further add indication information to the additional-information request message. The indication information includes at least one of PLMN request information, area identifier request information, and request information of the another remaining part of the context identifier obtained after the truncation.

The receiving unit 401 is further configured to receive, from the terminal device, a message that includes the additional information. Optionally, the receiving unit 401 is further configured to receive the preamble sent by the terminal device. The processing unit 402 is further configured to: allocate a transmission resource to the terminal device based on the preamble, and control the sending unit 403 to send information about the transmission resource to the terminal device. The receiving unit 401 is further configured to receive the additional information from the terminal device.

The processing unit 402 is further configured to: combine, into the complete context identifier, the part of the context identifier that is obtained after the truncation and that is included in the first message, and the another remaining part of the context identifier that is obtained after the truncation and that is obtained by using the additional information, and add the complete context identifier to the second message.

The processing unit 402 may be further configured to add, to the second message, the PLMN information corresponding to the second radio access network device and/or the area identifier corresponding to the second radio access network device, and the sending unit 403 sends the second message to the core network device.

Optionally, the processing unit 402 is further configured to add, to the second message, the stored PLMN information corresponding to the second radio access network device and/or the stored area identifier corresponding to the second radio access network device.

Optionally, the processing unit 402 is further configured to add an identifier of the radio access network device to the second message.

Optionally, the processing unit 402 is further configured to add the identifier of the second radio access network device to a routing information part of the second message.

The receiving unit 401 is further configured to receive verification information from the terminal device, and the processing unit 402 is further configured to add, to the second message, the verification information and information about a serving cell in which the radio access network device serves the terminal device. The information about the serving cell includes at least one of a physical cell identifier of the serving cell, a frequency band of the serving cell, and a cell global identifier of the serving cell.

Optionally, the processing unit 402 is further configured to determine, based on the identifier of the second radio access network device, whether an interface exists between the radio access network device and the second radio access network device. If the interface does not exist, the processing unit 402 controls the sending unit 403 to send the second message to the core network device.

The processing unit 402 may be further configured to decode the context information of the terminal device that is received from the core network device. The processing unit 402 may obtain an acknowledgement message from the context information. The acknowledgement message is used to feed back information that the second radio access network device has learned of a current location of the terminal device. Alternatively, the processing unit 402 may obtain, from the context information, a connection configuration parameter used to establish an RRC connection to the terminal device, so that the radio access network device can provide a data transmission service for the terminal device.

Other implementable functions of the foregoing units not described in detail are the same as related functions in the communication methods in a wireless network shown in FIG. 2 and FIG. 3. Details are not described herein again. Through collaborative cooperation between the foregoing units, when no available interface exists between the radio access network device and the second radio access network device, timely and effective communication can still be implemented by using the core network device as a message transfer medium, thereby improving working efficiency.

Functions of the units in the radio access network device may be implemented by using hardware, or may be implemented by executing corresponding software by hardware. For example, the foregoing units may be hardware that has a function of executing various modules, or may be another hardware device that can execute a corresponding computer program to complete the foregoing functions.

Figure 5:
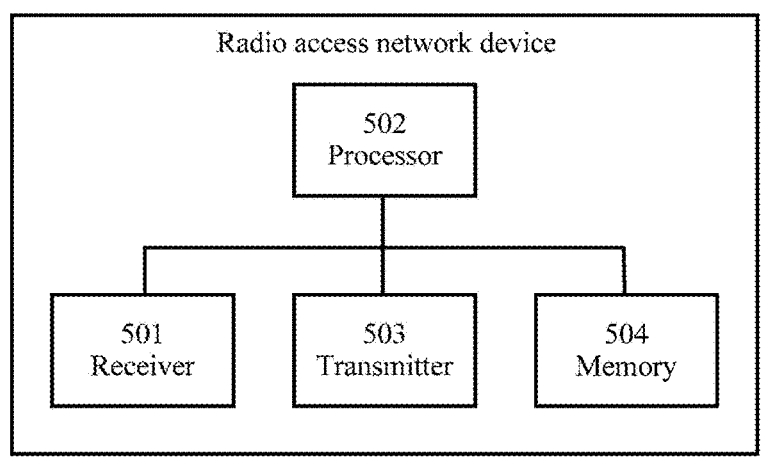
FIG. 5 is another possible schematic structural diagram of a radio access network device according to an embodiment of the present disclosure.

FIG. 5 is a possible schematic structural diagram of the radio access network device in the foregoing embodiments. The radio access network device includes a receiver 501, a processor 502, and a transmitter 503. The processing unit 402 described in FIG. 4 may be implemented by using the processor 502, the receiving unit 401 and the sending unit 403 may be respectively implemented by using the receiver 501 and the transmitter 503, and the receiver 501 and the transmitter 503 may be configured to support the radio access network device in receiving data from and sending data to the terminal device and the core network device in the foregoing embodiments. The radio access network device may further include a memory 504 that may be configured to store program code and data of the radio access network device. Components in the radio access network device are coupled together, and are configured to support various functions of the radio access network device in the communication methods in the embodiments described in FIG. 2 and FIG. 3.

Figure 6:
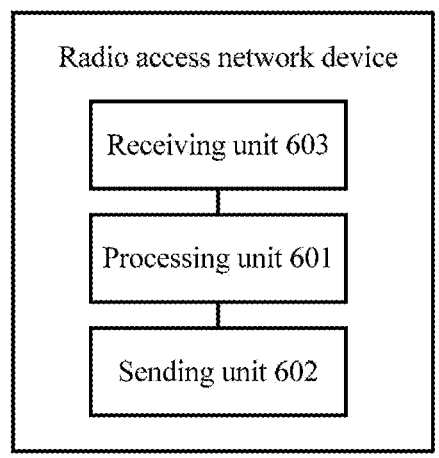
FIG. 6 is another possible schematic structural diagram of a radio access network device according to an embodiment of the present disclosure.

FIG. 6 is another possible schematic structural diagram of the radio access network device in the foregoing embodiments. It should be noted that the radio access network device can perform the methods in the foregoing embodiments. Therefore, for specific details of the radio access network device, refer to the descriptions in the foregoing embodiments. For brevity, same content is not described again below. The radio access network device may be the radio access network device 20 shown in FIG. 1A or FIG. 1B. The radio access network device may be a radio access network device that instructs a terminal device to enter a light connection mode. The radio access network device includes a processing unit 601, a sending unit 602, and a receiving unit 603.

The processing unit 601 is configured to allocate an identifier of a terminal device to the terminal device.

The sending unit 602 is configured to send a context identifier to the terminal device. The context identifier includes an identifier of the radio access network device and the identifier of the terminal device.

The receiving unit 603 is configured to receive, from a core network device, a message that includes the context identifier.

The processing unit 601 is further configured to determine context information of the terminal device in response to the message that includes the context identifier. The context information of the terminal device is associated with the identifier of the terminal device.

The sending unit 602 is further configured to send the context information of the terminal device to the core network device.

The processing unit 601 may be configured to combine, by using the method described in step S201 in FIG. 2, the identifier of the radio access network device and the identifier of the terminal device into continuous character strings, to form the context identifier. The processing unit 601 may be alternatively configured to combine the identifier of the radio access network device and the identifier of the terminal device into discontinuous character strings, to form the context identifier.

Optionally, the processing unit 601 is further configured to add, to the context identifier by using the method described in step S201 in FIG. 2, PLMN information corresponding to the radio access network device and/or an area identifier corresponding to the radio access network device.

The processing unit 601 may be further configured to decode the message that includes the context identifier and that is received by the receiving unit 603 from the core network device. The message further includes the PLMN information corresponding to the radio access network device and/or the area identifier corresponding to the radio access network device.

The processing unit 601 may be further configured to decode the message that includes the context identifier and that is received by the receiving unit 603 from the core network device. The message further includes at least one of an identifier of a first radio access network device, PLMN information corresponding to the first radio access network device, and an area identifier corresponding to the first radio access network device. The first radio access network device is a radio access network device that serves the terminal device.

The receiving unit 603 may be further configured to receive, from the core network device, verification information of the terminal device and information about a serving cell in which the first radio access network device serves the terminal device. The information about the serving cell includes at least one of a physical cell identifier of the serving cell, a frequency band of the serving cell, and a cell global identifier of the serving cell.

The processing unit 601 may be further configured to verify the terminal device based on the verification information and the information about the serving cell that are received by the receiving unit 603.

Optionally, before the receiving unit 603 receives, from the core network device, the message that includes the context identifier, the sending unit 602 is further configured to send control information to the terminal device. The control information is used to instruct the terminal device to enter a light connection mode.

Functions of the units in the radio access network device may be implemented by using hardware, or may be implemented by executing corresponding software by hardware.

For example, the foregoing units may be hardware that has a function of executing various modules, or may be another hardware device that can execute a corresponding computer program to complete the foregoing functions.

Figure 7:
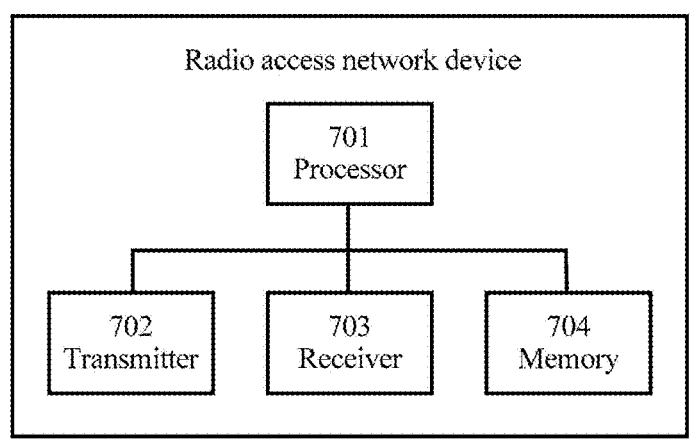
FIG. 7 is another possible schematic structural diagram of a radio access network device according to an embodiment of the present disclosure.

FIG. 7 is another possible schematic structural diagram of the radio access network device in the foregoing embodiments. The radio access network device includes a processor 701, a transmitter 702, and a receiver 703. The processing unit 601 described in FIG. 6 may be implemented by using the processor 701, the sending unit 602 and the receiving unit 603 may be respectively implemented by using the transmitter 702 and the receiver 703, and the transmitter 702 and the receiver 703 may be configured to support the radio access network device in receiving data from and sending data to the terminal device and the core network device in the foregoing embodiments. The radio access network device may further include a memory 704 that may be configured to store program code and data of the radio access network device. Components in the radio access network device are coupled together, and are configured to support various functions of the radio access network device in the communication methods in the embodiments described in FIG. 2 and FIG. 3.

It may be understood that FIG. 5 and FIG. 7 show only simplified designs of the radio access network devices. In actual application, the radio access network device may include any quantity of transmitters, receivers, processors, memories, and the like, and all radio access network devices that can implement the embodiments of the present disclosure fall within the protection scope of the present disclosure.

Figure 8:
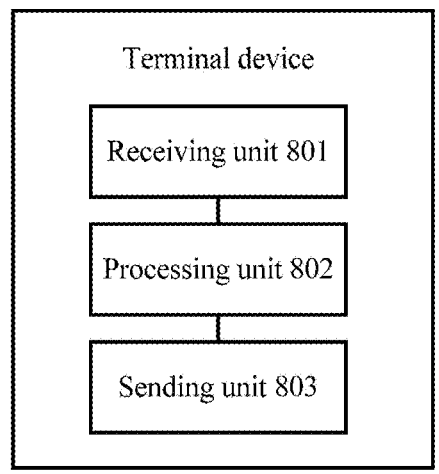
FIG. 8 is a possible schematic structural diagram of a terminal device according to an embodiment of the present disclosure.

FIG. 8 is a possible schematic structural diagram of the terminal device in the foregoing embodiments. It should be noted that the terminal device can perform the methods in the foregoing embodiments. Therefore, for specific details of the terminal device, refer to the descriptions in the foregoing embodiments. For brevity, same content is not described again below. The terminal device may be the terminal device 30 shown in FIG. 1A or FIG. 1B. The terminal device includes a receiving unit 801, a processing unit 802, and a sending unit 803.

The receiving unit 801 is configured to receive a context identifier from a second radio access network device.

The processing unit 802 is configured to decode the context identifier. The context identifier includes an identifier of the second radio access network device and an identifier of the terminal device that is allocated by the second radio access network device.

The sending unit 803 is configured to send a first message to a first radio access network device. The first message includes the context identifier.

Optionally, the processing unit 802 is further configured to truncate the context identifier according to an instruction of the first radio access network device by using the method described in step S202 shown in FIG. 2, to control the sending unit 803 to send only a part of the context identifier obtained after the truncation.

The processing unit 802 may be further configured to add, to the first message, PLMN information corresponding to the second radio access network device and/or an area identifier corresponding to the second radio access network device. Same as that described in step S202 shown in FIG. 2, the PLMN information corresponding to the second radio access network device and/or the area identifier corresponding to the second radio access network device may be carried in the first message in a manner of being included in the context identifier, or may be carried in the first message in a manner of being independent of the context identifier.

Optionally, the processing unit 802 is further configured to determine, by using the method described in step S202 in the method shown in FIG. 2, the PLMN information of the second radio access network device that is carried in the first message. Specifically, the processing unit 802 determines, based on a recorded PLMN corresponding to the second radio access network device and a PLMN that is broadcast in a cell in which the first radio access network device provides a service and that is received by the receiving unit 801, the PLMN information corresponding to the second radio access network device.

Optionally, before the sending unit 803 sends the first message, the receiving unit 801 is further configured to receive the second area identifier of the second radio access network device and a first area identifier of the first radio access network device. The processing unit 802 is further configured to: determine whether the second area identifier is the same as the first area identifier, and add, to the first message, area identifier indication information that indicates whether the first area identifier is the same as the second area identifier.

Optionally, as described in the methods shown in FIG. 2 and FIG. 3, if the processing unit 802 determines that the second area identifier is different from the first area identifier, the receiving unit 801 is further configured to receive an area identifier request message from the first radio access network device. The processing unit 802 is further configured to: respond to the area identifier request message, and control the sending unit 803 to send the second area identifier to the first radio access network device.

Optionally, as described in the method in FIG. 2, the receiving unit 801 is further configured to receive an additional-information request message sent by the first radio access network device. The processing unit 802 is further configured to decode the additional-information request message, to obtain preamble allocation information carried in the additional-information request message. The processing unit 802 is further configured to obtain indication information included in the additional-information request message. The indication information includes at least one of PLMN request information, area identifier request information, and request information of the remaining part of the context identifier obtained after the truncation. The processing unit 802 is further configured to determine, based on the indication information, information that needs to be sent.

The sending unit 803 may be further configured to send a preamble to the first radio access network device based on the preamble allocation information. The receiving unit 801 is further configured to receive, from the first radio access network device, information about an allocated transmission resource. The sending unit 803 is further configured to send additional information to the first radio access network device by using the transmission resource. The sending unit 803 may send the additional information through a common control channel.

The receiving unit 801 may be further configured to receive control information from the second radio access network device. The processing unit 802 is further configured to: respond to the control information, and control the terminal device to enter a light connection mode.

The sending unit 803 may be further configured to send verification information of the terminal device to the first radio access network device.

Other implementable functions of the foregoing units not described in detail are the same as related functions in the communication methods in a wireless network shown in FIG. 2 and FIG. 3. Details are not described herein again. Through collaborative cooperation between the foregoing units, the terminal device can send, to the first radio access network device, the PLMN information corresponding to the second radio access network device and/or the area identifier corresponding to the second radio access network device when occupying as few transmission resources as possible.

Functions of the units in the terminal device may be implemented by using hardware, or may be implemented by executing corresponding software by hardware. For example, the foregoing units may be hardware that has a function of executing various modules, or may be another hardware device that can execute a corresponding computer program to complete the foregoing functions.

Figure 9:
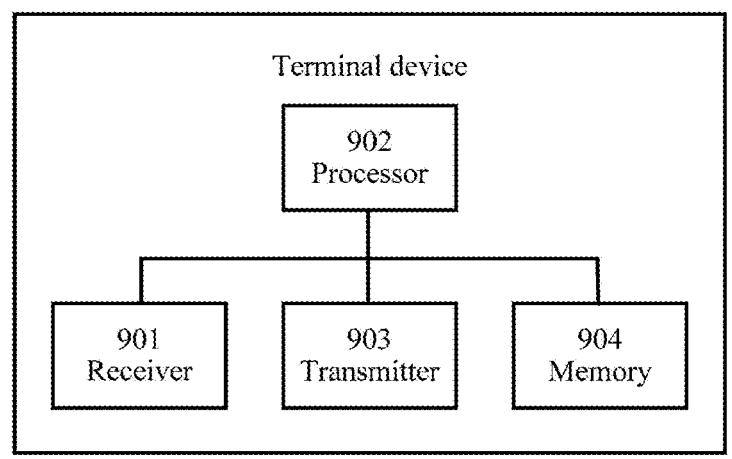
FIG. 9 is another possible schematic structural diagram of a terminal device according to an embodiment of the present disclosure.

FIG. 9 is a possible schematic structural diagram of the terminal device in the foregoing embodiments. The terminal device includes a receiver 901, a processor 902, and a transmitter 903. The receiving unit 801 and the sending unit 803 described in FIG. 8 may be implemented by using the receiver 901 and the transmitter 903, and the processing unit 802 may be implemented by using the processor 902. The receiver 901 and the transmitter 903 may be configured to support the terminal device in receiving data from and sending data to the first radio access network device and the second radio access network device in the foregoing embodiments. The terminal device may further include a memory 904 that may be configured to store program code and data of the terminal device. Components in the terminal device are coupled together, and are configured to support various functions of the terminal device in the communication methods in the embodiments described in FIG. 2 and FIG. 3.

It may be understood that FIG. 9 shows only a simplified design of the terminal device. In actual application, the terminal device may include any quantity of transmitters, receivers, processors, memories, and the like, and all terminal devices that can implement the embodiments of the present disclosure fall within the protection scope of the present disclosure.

Figure 10:
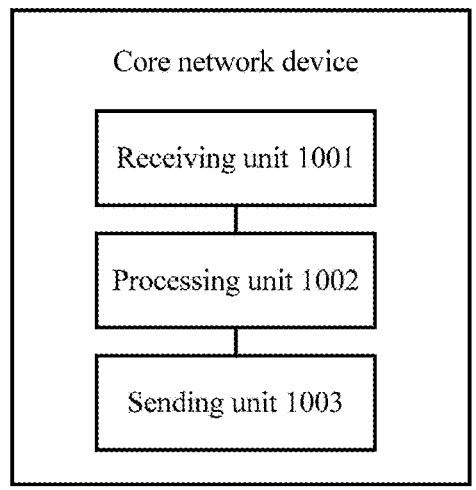
FIG. 10 is a possible schematic structural diagram of a core network device according to an embodiment of the present disclosure.

FIG. 10 is a possible schematic structural diagram of the core network device in the foregoing embodiments. It should be noted that the core network device can perform the methods in the foregoing embodiments. Therefore, for specific details of the core network device, refer to the descriptions in the foregoing embodiments. For brevity, same content is not described again below. The core network device may be the core network device 1 shown in FIG. 1A or FIG. 1B. The core network device includes a receiving unit 1001, a processing unit 1002, and a sending unit 1003.

The receiving unit 1001 is configured to receive a second message from a first radio access network device.

The processing unit 1002 is configured to decode the second message. The second message includes a context identifier of a terminal device, and the context identifier includes an identifier of a second radio access network device and an identifier of the terminal device that is allocated by the second radio access network device.

The sending unit 1003 is configured to send a third message to a second core network device or the second radio access network device. The third message includes the context identifier.

The receiving unit 1001 is further configured to receive context information of the terminal device from the second core network device or the second radio access network device. The context information is associated with the identifier of the terminal device.

The sending unit 1001 is further configured to send the context information to the first radio access network device.

Optionally, the processing unit 1002 is further configured to obtain, by decoding the second message, PLMN information corresponding to the second radio access network device and/or an area identifier corresponding to the second radio access network device that are/is carried in the second message. The PLMN information corresponding to the second radio access network device and/or the area identifier corresponding to the second radio access network device may be carried in the second message in a manner of being included in the context identifier, or may be carried in the second message in a manner of being independent of the context identifier.

The processing unit 1002 may be further configured to obtain, by decoding the second message, verification information and information about a serving cell in which the first radio access network device serves the terminal device, where the verification information and the information about the serving cell are carried in the second message. The information about the serving cell includes at least one of a physical cell identifier of the serving cell, a frequency band of the serving cell, and a cell global identifier of the serving cell.

The processing unit 1002 may be further configured to obtain, by decoding the second message, an identifier of the first radio access network device that is carried in the second message.

Optionally, the processing unit 1002 is further configured to add, to the third message, the PLMN information corresponding to the second radio access network device and/or the area identifier corresponding to the second radio access network device. The PLMN information corresponding to the second radio access network device and/or the area identifier corresponding to the second radio access network device may be carried in the third message in a manner of being included in the context identifier, or may be carried in the third message in a manner of being independent of the context identifier.

The processing unit 1002 may be further configured to add, to the third message, the verification information and the information about the serving cell in which the first radio access network device serves the terminal device.

The processing unit 1002 is further configured to add, to the third message, at least one of the identifier of the first radio access network device, PLMN information corresponding to the first radio access network device, and an area identifier corresponding to the first radio access network device.

Other implementable functions of the foregoing units not described in detail are the same as related functions in the communication methods in a wireless network shown in FIG. 2 and FIG. 3. Details are not described herein again. Through collaborative cooperation between the foregoing units, the core network device may be used as a message transfer medium, to implement timely and effective communication between the first radio access network device and the second radio access network device, thereby improving working efficiency.

Functions of the units in the core network device may be implemented by using hardware, or may be implemented by executing corresponding software by hardware. For example, the foregoing units may be hardware that has a function of executing various modules, or may be another hardware device that can execute a corresponding computer program to complete the foregoing functions.

Figure 11:
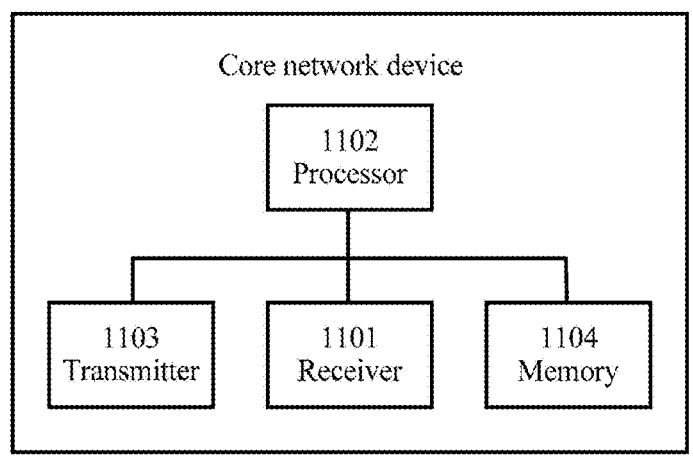
FIG. 11 is another possible schematic structural diagram of a core network device according to an embodiment of the present disclosure.

FIG. 11 is a possible schematic structural diagram of the core network device in the foregoing embodiments. The core network device includes a receiver 1101, a processor 1102, and a transmitter 1103. The processing unit 1002 described in FIG. 10 may be implemented by using the processor 1102, the receiving unit 1001 and the sending unit 1003 may be respectively implemented by using the receiver 1101 and the transmitter 1103, and the receiver 1101 and the transmitter 1103 may be configured to support the core network device in receiving data from and sending data to the radio access network devices in the foregoing embodiments. The core network device may further include a memory 1104 that may be configured to store program code and data of the core network device. Components in the core network device are coupled together, and are configured to support various functions of the core network device in the communication methods in the embodiments described in FIG. 2 and FIG. 3.

Figure 12:
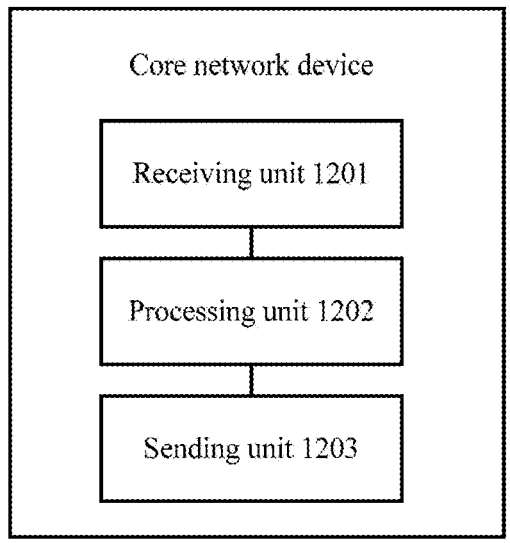
FIG. 12 is another possible schematic structural diagram of a core network device according to an embodiment of the present disclosure.

FIG. 12 is another possible schematic structural diagram of the core network device in the foregoing embodiments. It should be noted that the core network device can perform the methods in the foregoing embodiments. Therefore, for specific details of the core network device, refer to the descriptions in the foregoing embodiments. For brevity, same content is not described again below. The core network device may be the core network device 2 shown in FIG. 1B. The core network device includes a receiving unit 1201, a processing unit 1202, and a sending unit 1203.

The receiving unit 1201 is configured to receive a fourth message from a first radio access network device or a first core network device.

The processing unit 1202 is configured to decode the fourth message. The fourth message includes a context identifier of a terminal device, and the context identifier includes an identifier of a second radio access network device and an identifier of the terminal device that is allocated by the second radio access network device.

The sending unit 1203 is configured to send, to the second radio access network device, a message that includes the context identifier.

The receiving unit 1201 is further configured to receive context information of the terminal device from the second radio access network device. The context information of the terminal device is associated with the identifier of the terminal device.

The sending unit 1203 is further configured to send the context information to the first radio access network device or the first core network device.

Optionally, the processing unit 1202 is further configured to obtain, by decoding the fourth message, PLMN information corresponding to the second radio access network device and/or an area identifier corresponding to the second radio access network device that are/is carried in the fourth message. The PLMN information corresponding to the second radio access network device and/or the area identifier corresponding to the second radio access network device may be carried in the fourth message in a manner of being included in the context identifier, or may be carried in the fourth message in a manner of being independent of the context identifier.

The processing unit 1202 may be further configured to obtain, by decoding the fourth message, an identifier of the first radio access network device that is carried in the fourth message.

The processing unit 1202 may be further configured to obtain, by decoding the fourth message, verification information and information about a serving cell in which the first radio access network device serves the terminal device, where the verification information and the information about the serving cell are carried in the fourth message. The information about the serving cell includes at least one of a physical cell identifier of the serving cell, a frequency band of the serving cell, and a cell global identifier of the serving cell.

Optionally, the processing unit 1202 is further configured to add, to the message that includes the context identifier, at least one of the identifier of the first radio access network device, PLMN information corresponding to the first radio access network device, and an area identifier corresponding to the first radio access network device.

Optionally, the sending unit 1203 is further configured to send, to the second radio access network device, the verification information of the terminal device and the information about the serving cell in which the first radio access network device serves the terminal device.

Other implementable functions of the foregoing units not described in detail are the same as related functions in the communication methods in a wireless network shown in FIG. 2 and FIG. 3. Details are not described herein again. Through collaborative cooperation between the foregoing units, the core network device may be used as a message transfer medium, to implement timely and effective communication between the first radio access network device and the second radio access network device, thereby improving working efficiency.

Functions of the units in the core network device may be implemented by using hardware, or may be implemented by executing corresponding software by hardware. For example, the foregoing units may be hardware that has a function of executing various modules, or may be another hardware device that can execute a corresponding computer program to complete the foregoing functions.

Figure 13:
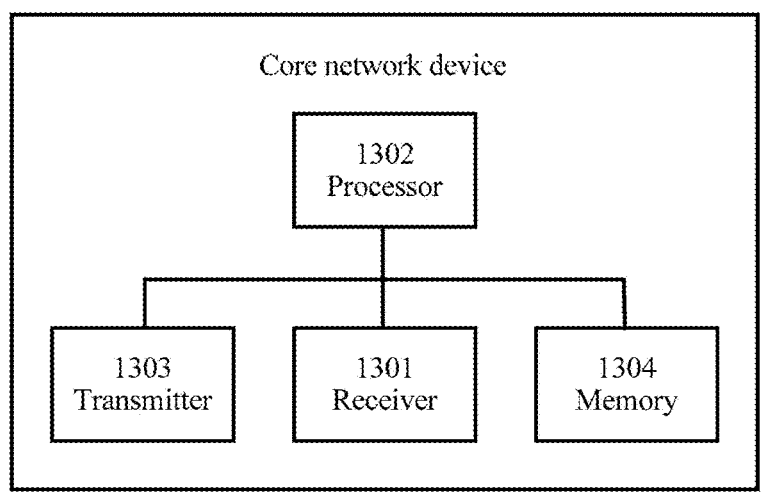
FIG. 13 is another possible schematic structural diagram of a core network device according to an embodiment of the present disclosure.

FIG. 13 is a possible schematic structural diagram of the core network device in the foregoing embodiments. The core network device includes a receiver 1301, a processor 1302, and a transmitter 1303. The processing unit 1202 described in FIG. 12 may be implemented by using the processor 1302, the receiving unit 1201 and the sending unit 1203 may be respectively implemented by using the receiver 1301 and the transmitter 1303, and the receiver 1301 and the transmitter 1303 may be configured to support the core network device in receiving data from and sending data to the radio access network devices in the foregoing embodiments. The core network device may further include a memory 1304 that may be configured to store program code and data of the core network device. Components in the core network device are coupled together, and are configured to support various functions of the core network device in the communication methods in the embodiments described in FIG. 2 and FIG. 3.

It should be understood that FIG. 11 and FIG. 13 show only simplified designs of the core network devices. In actual application, the core network device may include any quantity of transmitters, receivers, processors, memories, and the like, and all core network devices that can implement the embodiments of the present disclosure fall within the protection scope of the present disclosure.

A person skilled in the art may further understand that various illustrative logical blocks and steps that are listed in the embodiments of the present disclosure may be implemented by using electronic hardware, computer software, or a combination thereof. In order to clearly demonstrate interchangeability between the hardware and the software, functions of the foregoing various illustrative components and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the protection scope of the embodiments of the present disclosure.

The various illustrative logical blocks, modules, and circuits described in the embodiments of the present disclosure may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any conventional processing unit, controller, microcontroller, or state machine. The processing unit may be implemented by a computing apparatus combination, such as a digital signal processing unit and a microprocessing unit, a plurality of microprocessing units, one or more microprocessing units with a digital signal processing unit core, or any other similar configuration.

Steps of the methods or algorithms described in the embodiments of the present disclosure may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may connect to a processing unit so that the processing unit may read information from the storage medium and write information to the storage medium. Optionally, the storage medium may be integrated into a processing unit. The processing unit and the storage medium may be configured in an ASIC, and the ASIC may be configured in a user terminal. Optionally, the processing unit and the storage medium may be configured in different components of the user terminal.

In one or more example designs, the functions described in the embodiments of the present disclosure may be implemented by using hardware, software, firmware, or any combination thereof. If the functions are implemented by software, these functions may be stored in a computer-readable medium or are transmitted to the computer-readable medium in a form of one or more instructions or code. The computer-readable medium includes a computer storage medium and a communications medium that allows a computer program to move from one place to another. The storage medium may be an available medium that can be accessed by any general-purpose or special computer. For example, such a computer readable medium may include but is not limited to a RAM, a ROM, an EEPROM, a CD-ROM or another optical disc storage, a disk storage or another magnetic storage apparatus, or any other medium that may be used to bear or store program code, where the program code is in a form of an instruction or a data structure or in a form that can be read by a general-purpose or special computer or a general-purpose or special processing unit. In addition, any connection may be appropriately defined as a computer-readable medium. For example, if software is transmitted from a website, a server, or another remote resource through a coaxial cable, an optical fiber computer, a twisted pair, a digital subscriber line (DSL), or in a wireless manner, such as infrared, radio, or microwave, the software is included in the defined computer-readable medium. The disk and the disc include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present disclosure, technologies in the art may use or implement the content of the present disclosure. Any modification based on the disclosed content shall be considered obvious in the art. The basic principles described in the present disclosure may be applied to other variations without departing from the essence and scope of the present disclosure. Therefore, the content disclosed in the present disclosure is not limited to the described embodiments and designs but may also be extended to a maximum scope that is consistent with the principles and disclosed new features of the present disclosure.

What is claimed is:

1. A communication method comprising:
receiving a first message from a terminal device, wherein the first message comprises a first part of an identifier, wherein the identifier is used to uniquely identify the terminal device within a tracking area;
receiving a second message from the terminal device, wherein the second message comprises a second part of the identifier;
sending a third message to a core network device that controls at least a radio access network device, wherein the third message comprises the identifier; wherein the identifier is formed by the first part of the identifier and the second part of the identifier; and
receiving context information of the terminal device from the core network device, wherein the context information of the terminal device is associated with the identifier.

2. The method according to claim 1, wherein the first part of the identifier or the second part of the identifier is obtained by truncating the identifier.

3. The method according to claim 1, further comprising:
sending a fourth message to the terminal device to request the second part of the identifier.

4. The method according to claim 1, further comprising:
determining based on the first message, whether the second part of the identifier needs to be obtained; and
based on a determination that the second part of the identifier needs to be obtained, sending a fourth message to the terminal device to request the second part of the identifier.

5. The method according to claim 3, wherein the fourth message is sent to the terminal device through a common control channel.

6. A communication method comprising:
sending a first message to a radio access network device, wherein the first message comprises a first part of an identifier, wherein the identifier is used to uniquely identify a terminal device within a tracking area; and
sending a second message to the radio access network device, wherein the second message comprises a second part of the identifier,
wherein the identifier is formed by the first part of the identifier and the second part of the identifier and is sent to a core network device that controls at least the radio access network device.

7. The method according to claim 6, further comprising:
truncating the identifier to obtain the first part of the identifier or the second part of the identifier.

8. An apparatus, comprising:
at least one processor configured to;
receive a first message from a terminal device, wherein the first message comprises a first part of an identifier, wherein the identifier is used to uniquely identify the terminal device within a tracking area;
receive a second message from the terminal device, wherein the second message comprises a second part of the identifier;
send a third message to a core network device that controls at least a radio access network device, wherein the third message comprises the identifier; wherein the identifier is formed by the first part of the identifier and the second part of the identifier; and
receive context information of the terminal device from the core network device, wherein the context information of the terminal device is associated with the identifier.

9. The apparatus according to claim 8, wherein the first part of the identifier or the second part of the identifier is obtained by truncating the identifier.

10. The apparatus according to claim 8, wherein the at least one processor is further configured to:
send a fourth message to the terminal device to request the second part of the identifier.

11. The apparatus according to claim 8, wherein the at least one processor is further configured to:
determine based on the first message, whether the second part of the identifier needs to be obtained; and
based on a determination that the second part of the identifier needs to be obtained, send a fourth message to the terminal device to request the second part of the identifier.

12. The apparatus according to claim 10, wherein the fourth message is sent to the terminal device through a common control channel.

13. The method according to claim 6, wherein a identifier is formed by the first part of the identifier and the second part of the identifier.

14. An apparatus, comprising:
at least one processor configured to;
send a first message to a radio access network device, wherein the first message comprises a first part of an identifier, wherein the identifier is used to uniquely identify a terminal device within a tracking area; and
send a second message to the radio access network device, wherein the second message comprises a second part of the identifier;
wherein the identifier is formed by the first part of the identifier and the second part of the identifier and is sent to a core network device that controls at least the radio access network device.

15. The method according to claim 6, further comprising:
receiving a fourth message from the radio access network device for requesting the second part of the identifier.

16. The method of claim 1, wherein the radio access network device includes an evolved nodeB (eNB), and the core network device includes a mobility management entity (MME).

17. The method of claim 1, wherein the sending a third message to a core network device is performed based on communication with an anchor network device of the terminal device not being able to be performed.

18. The apparatus of claim 8, wherein that the at least one processor is configured to send a third message to a core network device is performed based on communication with an anchor network device of the terminal device not being able to be performed.

* * * * *